Aug. 20, 1935.  H. C. HEINSEN  2,012,193
COLLAPSIBLE AUTOMOBILE BED
Filed May 21, 1934  2 Sheets-Sheet 1
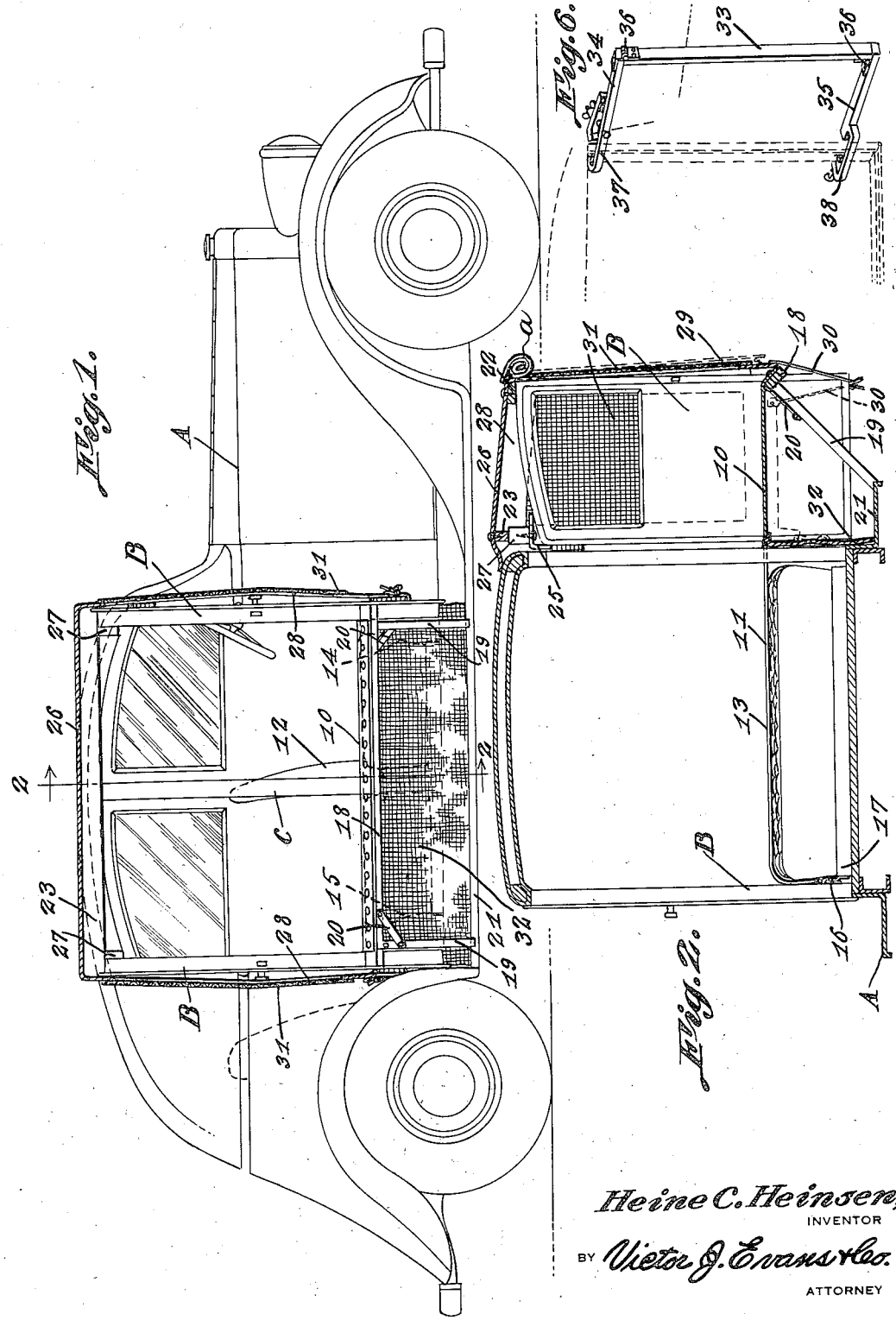
Heine C. Heinsen,
INVENTOR
BY Victor J. Evans &Co.
ATTORNEY

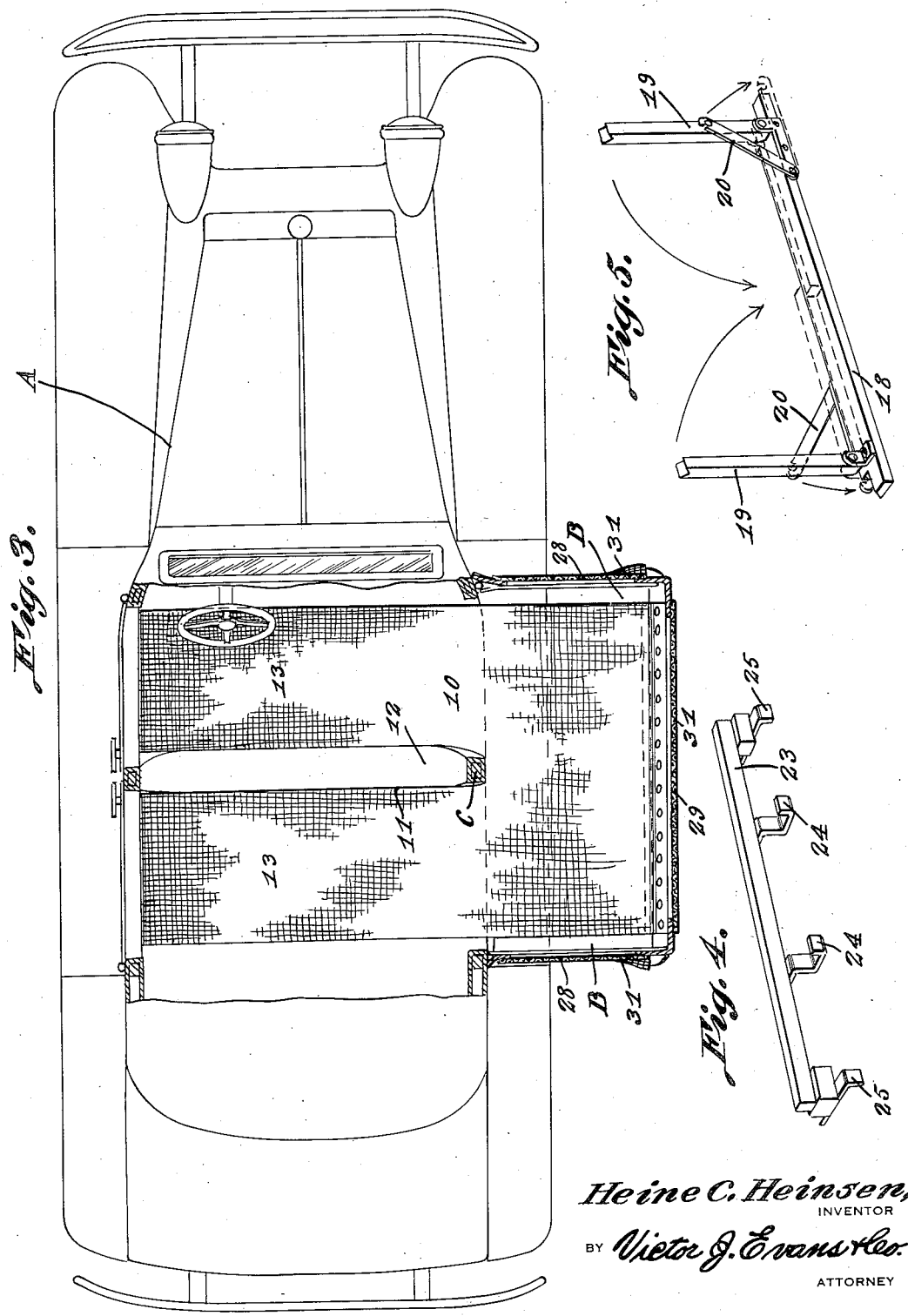

Patented Aug. 20, 1935

2,012,193

UNITED STATES PATENT OFFICE 2,012,193

COLLAPSIBLE AUTOMOBILE BED

Heine C. Heinsen, Clinton, Iowa

Application May 21, 1934, Serial No. 726,801

6 Claims. (Cl. 5—118)

The invention relates to a bed attachment for motor vehicles and those of the passenger or pleasure type and more especially to a collapsible automobile bed.

The primary object of the invention is the provision of a bed of this character, wherein the same is adaptable for use with the front and rear side cushions of a passenger or pleasure car, so that there will be a bed for sleeping purposes accommodating several occupants and such occupants will be protected from weather elements in the use of the bed.

Another object of the invention is the provision of a bed of this character, wherein it is readily folded or collapsed for storage or carriage in the least possible space and for convenience during touring in a passenger or pleasure automobile, the bed in its entirety being of novel construction and readily and conveniently set up for use or collapsed at the option of the owner thereof.

A further object of the invention is the provision of a bed of this character which is comparatively simple in its construction, thoroughly reliable and efficient in its purpose, assuring protection to occupants when in use, adaptable for assembly with various types of passenger or pleasure motor cars, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of a motor vehicle of the sedan type, showing the bed in vertical section constructed in accordance with the invention as applied to the vehicle.

Figure 2 is a sectional view on the line 2—2 of Figure 1 looking in the direction of the arrows.

Figure 3 is a top plan view of the vehicle partly broken away with the bed set up for use.

Figure 4 is a perspective view of one of the attaching bars for the canopying of the bed.

Figure 5 is a perspective view of a prop associated with the bed.

Figure 6 is a perspective view of a modified support for the canopy for the bed, this being used where several doors of the vehicle swing in one direction, either forwardly or rearwardly.

Similar reference characters indicate corresponding parts throughout the several views in the drawings.

Referring to the drawings in detail, particularly Figures 1 to 5, A designates generally a motor vehicle, in this instance of the sedan type, having the doors B which swing in reverse directions, the fore door swinging forwardly and the aft door swinging rearwardly to open position from a center post C of a double door frame, this construction being conventional in various types of motor vehicles of the passenger or pleasure kind.

The collapsible automobile bed constituting the present invention is employed with the vehicle A when the doors B are open and extend laterally at right angles to the body of the vehicle. This bed comprises a sheet-like section 10, preferably made from fabric, as for example, canvas, it being longitudinally split medially of its length and opening through one end to provide a clearance 11 for the back 12 of the front seat of the vehicle, so that the portions 13 of this body 10 will overlie the front and rear cushions 14 and 15 of the front and back seats within the body of the vehicle, it being understood, of course, that the rear cushion 15 is shifted forwardly to abut the back 12 of the front seat when the bed is to be used. The portions 13, at their ends, are removably secured in any suitable manner, as at 16, to the bases 17 of the cushions 14 and 15 on that side of the body of the vehicle A remote from the doors B when in open position. The opposite ends of the body 10 with respect to the portions 13 are made secure to a prop including the transverse bar 18 to which are hinged, near the opposite ends thereof, the foldable legs 19, these being latched against folding movement through the medium of the hinged latch arms 20, and this prop is adapted to have its legs 19 fulcrumed with the step or running board 21 of the vehicle A, with the said legs inclined in the direction of the body of said vehicle, so that the sheet-like body 10 will be sustained taut for occupancy as a bed for the positioning of said body, as is clearly shown in Figures 2 and 3 of the drawings. The bar 18 at its ends is notched for receiving the corners of the door edges so that when the bar rests against the latter it will be prevented from moving inwardly. It will be apparent that the sheet-like body 10 extends laterally considerably beyond the cushions 14 and 15 through the door frame and between the open doors B of the vehicle to give the required capacity to the bed.

Adapted to be arranged in bridging relation to the open doors B of the vehicle are the outer and inner canopy top rails or bars 22 and 23, respectively, the latter being formed with the cleats 24 and 25, respectively, the cleats 24 being engaged with the head portion of the door frame of the body of the vehicle and the cleats 25 engaged with the tops of the doors B, while the rail or bar 22 rests upon the tops of the doors when in open position at the outermost corners thereof. These rails or bars 22 and 23 support the top 26 of a canopy, the top 26 being made secure to the bar or rail 22 in any suitable manner, while a bracing rib 27 fastened to said top rests upon the rail or bar 23.

Carried by the top 26 of the canopy are the side and front curtains 28 and 29, respectively, these being adapted for lowering position and carrying tie strings 30 to be looped beneath the lower bottom edges of the doors B for sustaining the same taut when in lowered position. It is preferable to have each curtain 28 and 29 fitted with a wire mesh or screen panel 31 for ventilating purposes. The front curtain 29 when raised can be rolled as at *a* and made secure in this condition in any suitable manner so that access may be had to the interior of the vehicle for occupying the bed.

Secured to the underside of the sheet-like body 10 at the door frame area thereof is a flexible apron or shield 32 to avoid the inflow of air from the outside to the interior of the body of the vehicle A from beneath the said sheet-like body 10 when the bed is set up for occupancy.

In Figure 6 of the drawings there is shown a collapsible supplemental frame including a main bar 33 and top and bottom reversely swinging arms 34 and 35, respectively, these being hinged, at 36, to the main bar 33 and formed with clamping jaws 37 and 38 adapted to fit the vertical side portion of the door frame to function as the equivalent to an open door when both doors of the body of the vehicle swing to open position in the same direction, either forwardly or rearwardly of the vehicle body, for supporting the canopy at one side thereof, while the rearmost door of the body of the vehicle supports the canopy at the other side of the same. The supplemental frame is readily folded by reversely swinging the arms 34 and 35 against the main bar 33 and thus enabling the supplemental frame to occupy the minimum of space when being stored or shipped.

From the foregoing it is though that the construction and manner of use of the bed will be clearly understood, particularly when reference is had to the illustrations in the drawings, and, therefore, a more extended explanation has been omitted.

What is claimed is:

1. A bed of the character described comprising a sheet-like body for attachment to front and rear seat cushions at one side of a vehicle body and to extend over the same and out through the doorways at the other side of the body, means for propping the sheet-like body at the end extended beyond the cushions through the doorways, and a collapsible canopy engageable about the edges of open doors in the doorways of the body of the vehicle to constitute a closure for the extended end of the sheet-like body.

2. A bed of the character described comprising a sheet-like body for attachment to front and rear seat cushions at one side of a vehicle body and to extend over the same and out through the doorways at the other side of the body, means for propping the sheet-like body at the end extended beyond the cushions through the doorways, a collapsible canopy engageable about the edges of open doors in the doorways of the body of the vehicle to constitute a closure for the extended end of the sheet-like body, and means effecting a substitute for one of the doors to form a side support for said canopy.

3. A bed of the character described comprising a sheet-like body for attachment to front and rear seat cushions at one side of a vehicle body and to extend over the same and out through the doorways at the other side of the body, means for propping the sheet-like body at the end extended beyond the cushions through the doorways, a collapsible canopy engageable about the edges of open doors in the doorways of the body of the vehicle to constitute a closure for the extended end of the sheet-like body, means effecting a substitute for one of the doors to form a side support for said canopy, and curtains included with said canopy.

4. A bed of the character described comprising a sheet-like body for attachment to front and rear seat cushions at one side of a vehicle body and to extend over the same and out through the doorways at the other side of the body, means for propping the sheet-like body at the end extended beyond the cushions through the doorways, a collapsible canopy engageable about the edges of open doors in the doorways of the body of the vehicle to constitute a closure for the extended end of the sheet-like body, means effecting a substitute for one of the doors to form a side support for said canopy, curtains included with said canopy, and screen panels carried by the curtains.

5. A bed of the character described comprising a sheet-like body for attachment to front and rear seat cushions at one side of a vehicle body to extend over the same and out through the doorways at the other side of the body, means for propping the sheet-like body at the end extended beyond the cushions through the doorways, a collapsible canopy engageable about the edges of open doors in the doorways of the body of the vehicle to constitute a closure for the extended end of the sheet-like body, means effecting a substitute for one of the doors to form a side support for said canopy, curtains included with said canopy, screen panels carried by the curtains, and means for holding the curtains in closing position.

6. A bed of the character described comprising a sheet-like body for attachment to front and rear seat cushions at one side of a vehicle body to extend over the same and out through the doorways at the other side of the body, means for propping the sheet-like body at the end extended beyond the cushions through the doorways a collapsible canopy engageable about the edges of open doors in the doorways of the body of the vehicle to constitute a closure for the extended end of the sheet-like body, means effecting a substitute for one of the doors to form a side support for said canopy, curtains included with said canopy, screen panels carried by the curtains, means for holding the curtains in closing position, and supporting bars for the top of said canopy and engageable with the tops of said doors.

HEINE C. HEINSEN.